Patented June 3, 1952

2,599,264

UNITED STATES PATENT OFFICE 2,599,264

FLOORING COMPOSITION OF BLOWN PETROLEUM RESIDUE AND ASBESTOS FIBER

Harry W. Lawson, Chicago, Ill., assignor to Alpine Corporation, Chicago, Ill., a corporation of Illinois No Drawing. Application January 26, 1948, Serial No. 4,465

2 Claims. (Cl. 260—41)

This invention relates to resins obtained by processing certain by-products of the petroleum industry, to a method of forming said resins, and to novel floor tile and similar compositions, wherein certain of said resins exhibit unique advantages as binding agents.

Hitherto heavy petroleum residues, for example, still bottoms and oils from which distillable hydrocarbons have been removed—have been air blown, usually in the presence of a catalyst, at temperatures of 400° F. to 550° F. The melting points of the resins thus obtained regularly lie within the range of 220° F. up to 250° F. Such resins taken alone are too brittle to serve as binders in the manufacture of floor tile and similar flooring compositions; so it has been a regular practice to combine those resins with various plasticizers, in the form of fatty acid pitches obtained from vegetable and animal sources.

While such plasticizers reduce the brittleness of the above resins, they possess the important disadvantages of being saponified by alkaline detergents. The result is that floor tiles, containing such plasticized resins, when subjected to the ordinary amount of scrubbing with alkaline soaps and similar detergents, tend to become weakened and fragmented, particularly along their edges; so that the life of such tiles is unduly limited.

I have discovered that in making floor tile and similar flooring compositions, the incorporation of plasticizing agents with resins obtained from mineral oil sources can be avoided—with the consequent elimination of the disadvantages inhering in such agents as components of binders for flooring compositions. In the practice of my discovery I employ certain novel method steps whereby to form novel resins including resins that are particularly well adapted for use as binders in the manufacture of flooring compositions; all of said resins possessing marked resistance to saponification by alkaline agents.

A principal object of my invention is to provide a method of forming, from raw materials of petroleum origin, unsaponifiable resins that possess at ordinary temperatures the optimal degrees of cold flow and of flexibility that have been sought for binders for flooring composition.

Another principal object of my invention is to provide an unsaponifiable resin, substantially entirely derived from petroleum, that possesses by itself the aforementioned optimal characteristics as to cold flow and flexibility.

Another object is to provide an unsaponifiable resin of mineral origin that is adapted, without addition thereto of any plasticizer of vegetable or animal origin, to serve as a binder in the manufacture of so called asphalt tile.

Still another object is to provide a novel floor tile, or flooring composition, wherein the binder component consists entirely of a resin derived from the source, and possessing the physical characteristics set forth in the second paragraph next above.

Other objects of, and uses for, my invention will appear as the description thereof proceeds.

An illustrative example of the practice of my novel process is the following:

As a raw material I preferably employ a partially polymerized residue from cracked gasoline that has been prepared by the so called gray tower process. This raw material possesses substantially the following characteristics: Its pour point lies within the range from about 30° F. to about 80° F.; and its iodine number lies within the range from about 180 to about 240. I also may use as a raw material any similar petroleum residue having the characteristics just stated.

With a quantity of said raw material I incorporate a catalyst, generally in the proportion of one ounce of catalyst to about 10 pounds of raw material. The amount of catalyst, however, may be varied from about one-half ounce to about 2 ounces per 10 pounds of raw material. The quantity of catalyst thus ranges from about 0.3 per cent to about 1.2 per cent, calculated on the raw material.

The catalyst preferably is a naphthenate of manganese, iron or lead, or a suitable mixture of such metallic naphthenates, preferably containing about 6 per cent of metallic component. Nevertheless, any other substance that is compatible with the raw material, that is suitably dispersible therein, and that is adapted for catalyzing the resinification thereof, without reducing the iodine number of the product below about 160, also may be employed as a catalyst.

I next heat the mixture of raw material and catalyst in a retort or other suitable vessel, preferably at atmospheric pressure, at the same time bubbling air through the mixture. I have found that 375° F. is a critical maximum temperature for the most efficient practice of my process, in order that the product thereof shall possess the desirable characteristics as to cold flow and flexibility that I have stated above.

The duration of the heating period that I employ depends largely upon whether or not I carry my operating temperature up to the maximum of 375° F. At the latter temperature my heating period ordinarily lies within the range of about one hour to about 15 hours, depending upon the melting point of the particular product that I desire; which melting point may lie within the range from about 70° F. to about 190° F. In general, the melting point of the product rises about 5° F. for each hour during which the raw material is processed at a temperature of 375° F.

At times it is a matter of practical advantage to employ lower heating temperatures; although, for example, when the heating temperature lies within the range from about 270° F. to about 300° F., the time required to form a product having a given melting point is substantially longer than is the case at 375° F.

In the bubbling of air through the heated mixture of raw material and catalyst I preferably employ as great a volume of air, with as small bubbles and as much turbulence, as possible, having in view (a) the increasing resistance to the passage of air through the heated mixture as resinification proceeds, and (b) the avoidance of excessive spattering of the contents of the retort or treating vessel.

The products derived from the foregoing raw material, by the treatment described above, are resins that have melting points within the range from about 70° F. to about 190° F., and iodine numbers within the range from about 160 to about 220. All of these resins are characterized by marked resistance to saponification by alkaline agents. Of these resins those that have melting points below about 150° F. are adapted for a variety of uses that will be appreciated by those skilled in the art, where a desideratum of such a resin is unsaponifiability.

Of the novel resins that are products of the method described hereinabove, those having melting points within the range of temperatures from about 150° F. to about 190° F. are especially adapted for use as sole binding materials in the manufacture of so-called asphalt flooring tile, because they not only are resistant to saponification, as aforesaid, but they also possess by themselves the desirable cold flow and flexibility characteristics that are principal objects of my invention. In the manufacture of asphalt flooring tile my novel resins, having melting points within the range last above stated, can be used as binders without admixture with any other binding material or with any plasticizing agent. These same resins meet the specifications for such binders, as set forth in the Government publication entitled "Federal Specifications for Tile—Asphalt. SS-T-306-1A. From Federal Standards Stock Catalog, Section 4, Part 5."

I have found that I can form a lighter-colored product from the foregoing raw material, without adversely affecting the desirable properties just stated, by humidifying, in any suitable manner, the air that is blown through the heated mixture of the raw material and catalyst.

An example of a novel composition suitable for floor tile is an intimate mixture of the following ingredients, in percentages by weights: A resin resulting from the practice of my novel method, melting preferably at about 180° F., about 28 per cent to about 30 per cent; pigment, from about 2 per cent to about 10 per cent; the balance to make 100 per cent, a suitable wear-resistant filler of which all or at least 70 per cent thereof consists of short asbestos fibers; any additional filler being selected from finely divided mineral matter, known to the floor-tile art, such as powdered limestone, or powdered clays, sands or slags.

The foregoing description is intended to be illustrative only, and in no way limitative of my invention; it being my intention to claim all the variants and modifications thereof that may come within the legitimate scope of the appended claims.

I claim:

1. A flooring composition which is free from a plasticizing agent as an ingredient thereof; a component of said composition being a resinous binder formed by treatment of a petroleum residue having initially a pour point within the range from about 30° F. to about 80° F., and an iodine number within the range from about 180 to about 240; said treatment comprising essentially the step of air blowing said residue in the presence of a catalyst at a temperature in the range from about 270° F. to 375° F.; said binder having a melting point within the range from about 70° F. to about 190° F. and an iodine number not substantially lower than 160 nor substantially higher than 220; said binder imparting to said flooring composition high resistance to saponification by alkaline agents and an effective degree of cold flow and of flexibility; said composition comprising, in intimate admixture, in parts by weight, from about 28 parts to about 30 parts of said resinous binder, about 2 parts to about 10 parts of pigment, and the balance, to make a total of 100 parts, of short asbestos fibers.

2. A flooring composition which is free from a plasticizing agent as an ingredient thereof; a component of said composition being a resinous binder formed by treatment of a petroleum residue having initially a pour point within the range from about 30° F. to about 80° F., and an iodine number within the range from about 180 to about 240; said treatment comprising essentially the step of air blowing said residue in the presence of a catalyst at a temperature in the range from about 270° F. to 375° F.; said binder having a melting point within the range from about 70° F. to about 190° F. and an iodine number not substantially lower than 160 nor substantially higher than 220; said binder imparting to said flooring composition high resistance to saponification by alkaline agents and an effective degree of cold flow and of flexibility; said composition comprising, in intimate admixture, in parts by weight, from about 28 parts to about 30 parts of said resinous binder; from about 2 parts to about 10 parts of pigment; not less than 70 per cent of the balance, needed to make a total of 100 parts, of short asbestos fibers; and the remainder of said balance in the form of a powdered filler from the class consisting of limestone, clays, sands and slags.

HARRY W. LAWSON.

REFERENCES CITED

The following references are of record in the file of this patent:

UNITED STATES PATENTS

| Number | Name | Date |
|---|---|---|
| 1,888,044 | Morrell | Nov. 15, 1932 |
| 2,008,103 | Hyman | July 16, 1935 |
| 2,035,455 | Bjerregaard | Mar. 31, 1936 |
| 2,390,189 | Soday | Dec. 4, 1945 |
| 2,559,985 | Morris | July 10, 1951 |

OTHER REFERENCES

Lee et al., Paint, Oil & Chem. Rev., pages 16-20 (January 8, 1948).